Oct. 1, 1968    C. E. LOESCH ET AL    3,403,773
LIVESTOCK FEEDER USING OPEN ENDED RECIPROCATING TROUGH
Filed Sept. 1, 1967

INVENTORS.
CLAUDE E. LOESCH &
LEO J. LOESCH

Tweedale & Gerhardt
ATTORNEYS.

United States Patent Office 3,403,773
Patented Oct. 1, 1968

3,403,773
LIVESTOCK FEEDER USING OPEN ENDED
RECIPROCATING TROUGH
Claude E. Loesch and Leo J. Loesch, both of Rte. 1,
Kimball, Minn. 55353
Continuation of application Ser. No. 543,134, Apr. 18,
1966. This application Sept. 1, 1967, Ser. No. 671,530
7 Claims. (Cl. 198—52)

ABSTRACT OF THE DISCLOSURE

A livestock feeder having a horizontally reciprocating trough which receives feed from a central supply spout to be distributed along a feed bunk beneath the trough. Swinging paddles along the path of the trough allow the feed to be simultaneously laid in the trough from the supply and discharged to the feed bunk at one or the other free end of the trough.

---

This is a continuation of Ser. No. 543,134, filed Apr. 18, 1966, now abandoned.

This invention relates to livestock feeders of the type which receives loose fodder from a conveyor or supply outlet and distributes it along the length of an animal feed trough or bunk. In our U. S. Patent No. 3,217,693, granted Nov. 16, 1965, we have shown a livestock feeder for such purposes in which an elongated feed carrier travels back and forth beneath the supply outlet and at each end of its travel the bottom of the carrier is opened to dump the feed into the trough below. The present invention aims to provide a feed distributing arrangement having the advantages of the aforesaid device but which can be constructed at a lower cost and with improved reliability.

The invention comprises a long narrow tray mounted for reciprocating horizontal movement underneath a source of continuously flowing fodder or other material. A reversing drive mechanism is connected to traverse the tray back and forth to receive the feed in successive layers along the length of the tray. Above the tray is mounted at spaced locations a number of dividers arranged along the path of travel of the tray. The dividers are so supported that as the tray moves under them in one direction they allow the layer of material to move along with the tray but when the drive mechanism reverses and the tray moves in the opposite direction the dividers are caused to enter the layer of material and prevent it from moving with the tray. The layer of material then progressively drops off the end of the tray and is distributed along a receiving trough beneath with about the same distribution as it occupied along the length of the tray.

Figure 1:
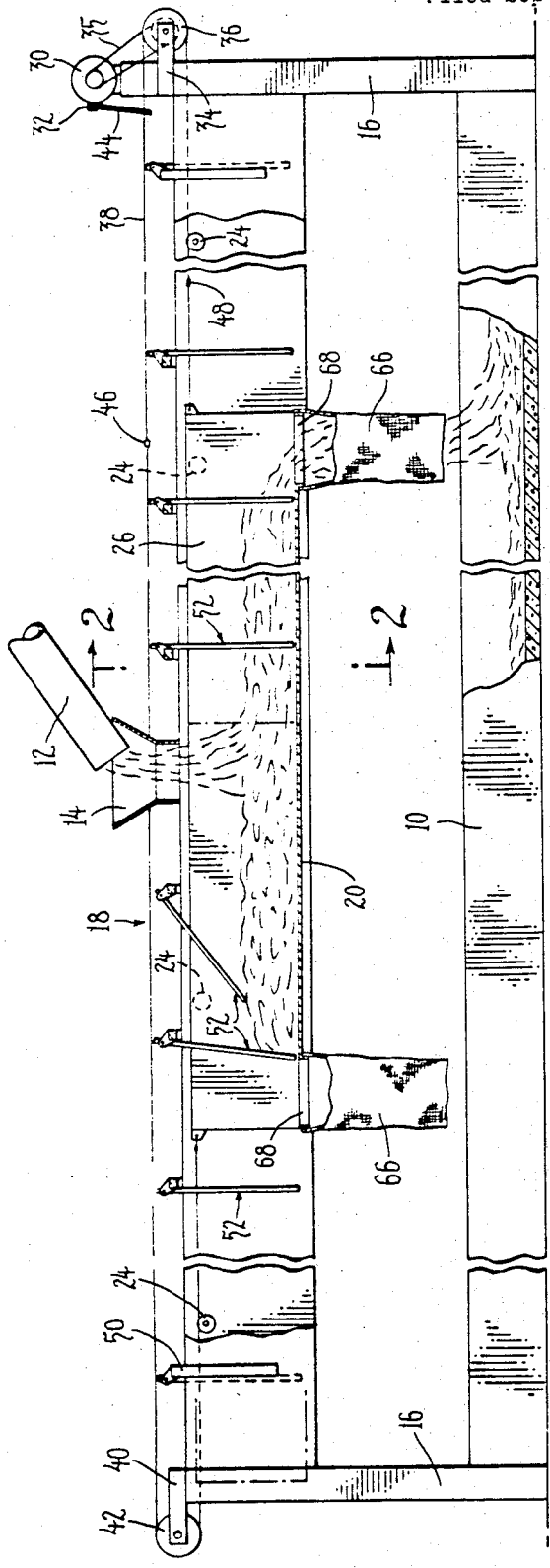
Figure 2:
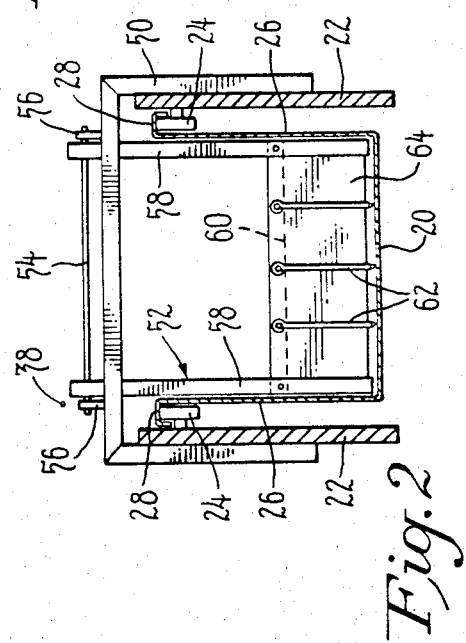

FIGURE 1 is a side view of a livestock feeder illustrating a preferred form of the present invention;
FIGURE 2 is a fragmentary sectional view taken on line 2—2 of FIGURE 1; and
FIGURE 3 is an enlarged view of the drive mechanism illustrated in FIGURE 1.

There is shown in FIGURE 1 a feed trough or bunk 10 to which feed is to be distributed from a delivery spout 12. Conveniently spout 12 leads from a conveyor system which in turn is fed by a silo unloader (not shown). A funnel 14 directs the continuously flowing feed or fodder, or other material, downwardly at a point substantially centrally of the feed bunk 10. Mounted on a suitable series of upright posts 16 is a distributing mechanism generally designated 18 and comprising an elongated tray 20 upon which the fodder may be temporarily supported in preparation for distribution to the feed bunk below. Extending between the end posts 16 are a pair of track members 22 each of which carries a series of track rollers 24 along its length. The tray 20 is provided with upright side members 26 having a channeled flange 28 at their top edges which is so shaped as to roll along the track provided by the series of rollers 24.

Figure 3:
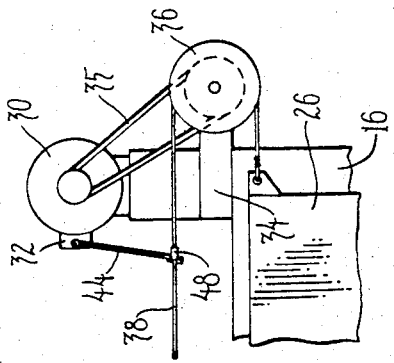

Drive mechanism is provided for tray 20, and may conveniently comprise a reversible electric motor 30 as shown in FIGURE 3, having a low speed output and controlled by a reversing switch 32. Journalled on a support block 34 is a capstan drum 36 around which is reeved a cable 38 one end of which is connected to one of the side walls 26. At the opposite end of the feed bunk another support block 40 supports a pulley 42 and the other end of the cable after passing around the pulley 42 is secured to the opposite end of side wall 26. The switch 32 has a depending arm 44 which is forked and straddles cable 38 so as to be actuated between forward and reverse positions by means of a pair of collars 46 and 48, securely fastened to cable 38 at appropriate points so as to assure reversing of the motor 30 as the tray reaches either end of its normal range of travel.

The track members 22 also carry by means of U-shaped brackets 50 a series of equally spaced dividers 52 arranged along the entire length of the track. Each divider 52 is mounted for free swinging movement upon a pivot bar 54 secured in upstanding brackets 56. Those of the pivot bars which lie to the left of the feed supply in FIGURE 1 are positioned slightly to the left of their supporting bracket 50 so that when the divider 52 hangs freely by gravity in the vertical position it is free to swing clockwise. However, the bracket 50 forms a stop preventing counter-clockwise swinging of the divider from vertical position. The pivot bars 54 which are to the right of the central feed supply face toward the right so that their dividers 52 are free to swing counter-clockwise but are blocked against clockwise movement away from vertical.

Each of the dividers 52 is preferably formed by a pair of vertical members 58 connected by a cross bar 60. Secured to the cross bar 60 are a plurality of downwardly facing tines 62 and a panel 64 which is preferably formed of a semiflexible material such as common flat rubber and canvas belting. The ends of tray 20 may be provided with tubular discharge chutes 66 which may take the form of flexible cloth tubes and which may be secured to a hollow square framework 68, secured at each open end of tray 20.

In operation, with feed being delivered from the delivery spout 12 and funnel 14, when the power switch (not shown) is closed to direct power to the motor 30, if the tray 20 happens to be at its right-hand position as illustrated in FIGURE 3 the switch arm 44 will have previously been operated by collar 48 to cause the motor to turn clockwise, driving the drum 36 and pulling the top reach of cable 38 to the right thus pulling the tray 20 to the left. As the tray progresses to the left, feed is distributed along the tray in a layer and as this layer abuts the end of each divider 52 it swings the divider clockwise and the divider rides lightly along the top of the fodder without disturbing the same to any significant degree.

When tray 20 reaches the left limit of its travel the collar 46 meets the arm 44 and reverses the motor 30. By this time the tray 20 has been filled with fodder along its length and as the tray travels back toward the right, all of the left-hand dividers 52 which lay in light contact with the top of the layer of feed are caused to engage and enter the layer with a sort of "pitch fork" action. As each divider reaches its vertical position its further swinging movement is blocked and the entire layer of fodder is thus prevented from traveling to the right with the tray 20. Instead the tray slides out from underneath the fodder and progressively drops it off from the left-hand end of the tray through delivery chute 66 and distributes it in the left-hand half of the bunk 10. The distribution is substantially the same as the distribution was when the layer of feed was positioned on top of the tray.

At the same time, as the right-hand end of the tray travels along beyond the central point it receives feed from the delivery funnel and builds up a second layer upon the empty space which is created as the tray moves out from beneath the first layer. When the tray reaches the right-hand end of its stroke the motor reverses, and through a corresponding action of the dividers on the right the second layer of feed is distributed in the right-hand half of feed bunk 10. In this manner the tray 20 will continue to reciprocate along the track rollers 24, distributing successive layers of feed first in one half and then in the other half of the feed bunk until the power supply to the motor is cut off.

We claim:

1. A device for distributing animal fodder or similar material along an elongated path of reciprocation and comprising an elongated tray no more than half as long as the path and open at both ends and forming a support for a layer of fodder received from a fodder delivery outlet, means supporting the tray for longitudinal travel along the path and beneath the delivery outlet to distribute fodder in a layer along the tray, a drive mechanism connected with the tray for alternately propelling the tray back and forth beneath the delivery outlet, a plurality of divider members longitudinally spaced along and above the path of the tray and means mounting each divider member for free swinging movement between a position allowing the layer of fodder to pass the divider member as the tray travels in one direction and another position of engagement into the layer of fodder as the tray travels in the opposite direction, those dividers which lie between the middle and one end of the path being restricted against swinging from midposition toward the opposite end of the path and those dividers which lie between the middle and the opposite end of the path being restricted against swinging from midposition toward the one end of the path whereby the layer of fodder is held against movement with the tray and is progressively dropped as an open end of the tray slides out from under the layer of fodder and simultaneously the cleared portion of the tray is filled from the delivery spout to be ready for dropping from the opposite end when the tray reverses.

2. The device of claim 1 wherein side walls are positioned adjacent the edges of the tray to confine the fodder against displacement laterally of the tray.

3. The device of claim 1 wherein each divider member is mounted for swinging movement about a horizontal axis transverse to and above the tray and a stop is provided to restrict the divider member to angular movement on only one side of a substantially vertical position.

4. The device of claim 1 wherein each divider member is provided with downwardly directed tines on its lower edge.

5. The device of claim 1 wherein each divider member has a lower portion formed of resilient flexible sheet material.

6. The device of claim 1 wherein the path of travel of the tray is substantially equal to twice the length of the tray.

7. The device of claim 1 wherein the drive mechanism is arranged to propel the tray back and forth between terminal positions substantially equidistant from the delivery outlet.

References Cited

UNITED STATES PATENTS

| | | |
|---|---|---|
| 728,460 | 5/1903 | Hart. |
| 1,051,728 | 1/1913 | German. |
| 1,549,877 | 8/1925 | Hurst et al. |
| 2,050,477 | 8/1936 | Weisselberg. |
| 2,279,837 | 4/1942 | Newlin. |
| 2,891,659 | 6/1959 | Westeren. |
| 2,936,082 | 5/1960 | Alimanestiano. |

EVON C. BLUNK, *Primary Examiner.*

M. L. AJEMAN, *Assistant Examiner.*